(12) United States Patent
Xu et al.

(10) Patent No.: US 8,458,731 B2
(45) Date of Patent: Jun. 4, 2013

(54) METHODS, SYSTEMS AND MEDIA FOR INSTALLING PERIPHERAL SOFTWARE DRIVERS

(75) Inventors: Yi Qi Xu, Shanghai (CN); Yi Ming Hua, Shanghai (CN); Ka Ki Yeung, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 1122 days.

(21) Appl. No.: 12/169,629

(22) Filed: Jul. 8, 2008

(65) Prior Publication Data

US 2010/0011379 A1    Jan. 14, 2010

(51) Int. Cl.
*G06F 3/00*    (2006.01)

(52) U.S. Cl.
USPC .......................................... 719/327; 719/321

(58) Field of Classification Search
USPC .................................. 719/321, 328, 330, 327
See application file for complete search history.

(56) References Cited

U.S. PATENT DOCUMENTS

| | | | |
|---|---|---|---|
| 5,630,076 A * | 5/1997 | Saulpaugh et al. | 710/104 |
| 5,974,474 A | 10/1999 | Furner | |
| 6,336,152 B1 * | 1/2002 | Richman et al. | 710/8 |
| 6,671,749 B2 | 12/2003 | Williams | |
| 7,735,098 B2 * | 6/2010 | Chang | 719/328 |
| 7,814,428 B2 * | 10/2010 | Bicker et al. | 715/763 |
| 2002/0129353 A1 | 9/2002 | Willams | |
| 2005/0132090 A1 | 6/2005 | Kim | |
| 2005/0246478 A1 * | 11/2005 | Tanaka | 710/315 |
| 2008/0123135 A1 * | 5/2008 | Inoue | 358/1.15 |

OTHER PUBLICATIONS

Randall Guensler, Development of a Comprehensive Vehicle Instrumentation Package for Monitoring Individual Tripmaking Behavior, Feb. 1999.*

* cited by examiner

*Primary Examiner* — Lechi Truong
(74) *Attorney, Agent, or Firm* — Baker Botts L.L.P.

(57) ABSTRACT

A method for installing peripheral software drivers including storing a first identifier for a peripheral device meant for compatible operation with an information handling system (IHS) in the non-volatile memory of the basic input/output system (BIOS) of the IHS, matching the peripheral device represented by the first identifier with compatible driver releases represented by a second identifier, sorting the compatible driver releases by priority and installing a highest priority driver release on the IHS.

12 Claims, 6 Drawing Sheets

FIG. 1

```
201                                            202
   HW sound EMBEDDED SIGMATEL_STAC9928 MM890
   HW modem NO
   HW network0 BROADBAND_5754M EMBEDDED JC052
   HW network1 FOXCONN_T60H938-00 PN771
   HW iab NO NO
   HW lang A_UK US 102
   HW battery 0 XG528 9 LITHIUM 80
   HW Bluetooth FOXCONN_355 USB CW725 413C 8126
   HW pci_info 0 1 RW331 10DE 0409 1028 019B 1
   HW pci_info 1 1 PC559 14E4 4311 1028 0007 1
                                               200
```

FIG. 2

| RCD Device Driver Information Table | |
|---|---|
| PK | driver release ID — 227 |
| PK | part number — 225 |
| PK | device ID — 226 |
| | priority number — 229 |

METHODS, SYSTEMS AND MEDIA FOR INSTALLING PERIPHERAL SOFTWARE DRIVERS

BACKGROUND

1. Technical Field

The present disclosure relates generally to the field of information handling systems. More specifically, but without limitation, the present disclosure relates to installing drivers for information handling systems.

2. Background Information

As the value and use of information continues to increase, individuals and businesses seek additional ways to process and store information. One option available to users is an information handling system (IHS or system). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The various computer systems, data storage systems, and networking systems that comprise an information handling system (IHS) may need to use software in addition to the system's operating system (OS) in order to work with peripheral hardware devices (peripheral device or peripheral) that a user may use in connection with an IHS. Such peripheral devices may include without limitation, keyboards, mice, printers, or microphones for example. IHSs typically store the basic software needed to run peripherals in the system's basic input/output system (i.e., "BIOS"), which consists of the software that acts as the interface between the OS and the peripherals.

More and more peripheral options now exist, which requires more peripheral software drivers (drivers) to be installed in IHSs to enable compatible operation with the IHS. Current methods of installing new drivers often require a change in the design of the peripheral device or in the IHS's OS or require the end user to decide which of several drivers should be installed. For example, some methods require the peripheral device to signal the OS of the selection of a new driver. Other methods require a special data section in the OS to be created to store and run the driver set up program stored in the peripheral device. The end user typically must go online to download software from a local area network ("LAN") or a wide area network ("WAN").

Resource CDs (i.e. RCDs or RDVDs), which are typically packaged with IHSs and sent to the end user, include peripheral device software drivers but have become increasingly complex and difficult to use as the range of peripheral devices has multiplied. Non-technical users often want to install whatever software drivers work best but lack the background knowledge necessary to make correct choices. The process of selecting the correct software drivers becomes even more challenging because new driver releases for old hardware and driver releases for new hardware will not be included in the RCDs for IHSs purchased prior to the drivers' release date.

A present trend among some manufacturers is to provide an end user with a custom built IHS in which the user has designated that certain components, including peripherals, are to be included and shipped with the new system. Streamlining the driver installation process for peripherals purchased together with a new IHS would improve the efficiency of the build-to-order process. Thus, a need exists for a method, system and media for updating peripheral software drivers that minimizes user confusion and permits one click installation particularly for peripherals purchased with an IHS as part of a build to order process.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for installing peripheral software drivers including storing a first identifier for a peripheral device meant for compatible operation with an information handling system (IHS) in the non-volatile memory of the basic input/output system (BIOS) of the IHS, matching the peripheral device represented by the first identifier with compatible driver releases represented by a second identifier, sorting the compatible driver releases by priority and installing a highest priority driver release on the IHS.

Another aspect of the disclosure provides a computer-readable medium having executable instructions for performing a method including storing a first identifier for a peripheral device meant for compatible operation with an information handling system (IHS) in the non-volatile memory of the basic input/output system (BIOS) of the IHS, matching the peripheral device represented by the first identifier with compatible driver releases represented by a second identifier, sorting the compatible driver releases by priority; and installing a highest priority driver release on the IHS.

Yet another aspect of the disclosure provides an information handling system (IHS) including a processor, non-volatile memory coupled to the processor, wherein the non-volatile memory is configured to store a first identifier for a peripheral device meant for compatible operation with the IHS and a storage device for reading computer readable media. The computer readable media has executable instructions for performing a method including matching the peripheral devices represented by the first identifier with compatible driver releases represented by a second identifier, sorting the compatible driver releases by priority and installing a highest priority driver release on the IHS.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

For purposes of this disclosure, an embodiment of an Information Handling System (IHS or system) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, read-only memory (ROM), and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Portions of the present disclosure, detailed description and claims may be presented in terms of logic, software or software implemented aspects typically encoded on a variety of media or medium including, but not limited to, computer-readable media, machine-readable media, program storage media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Figure 1:
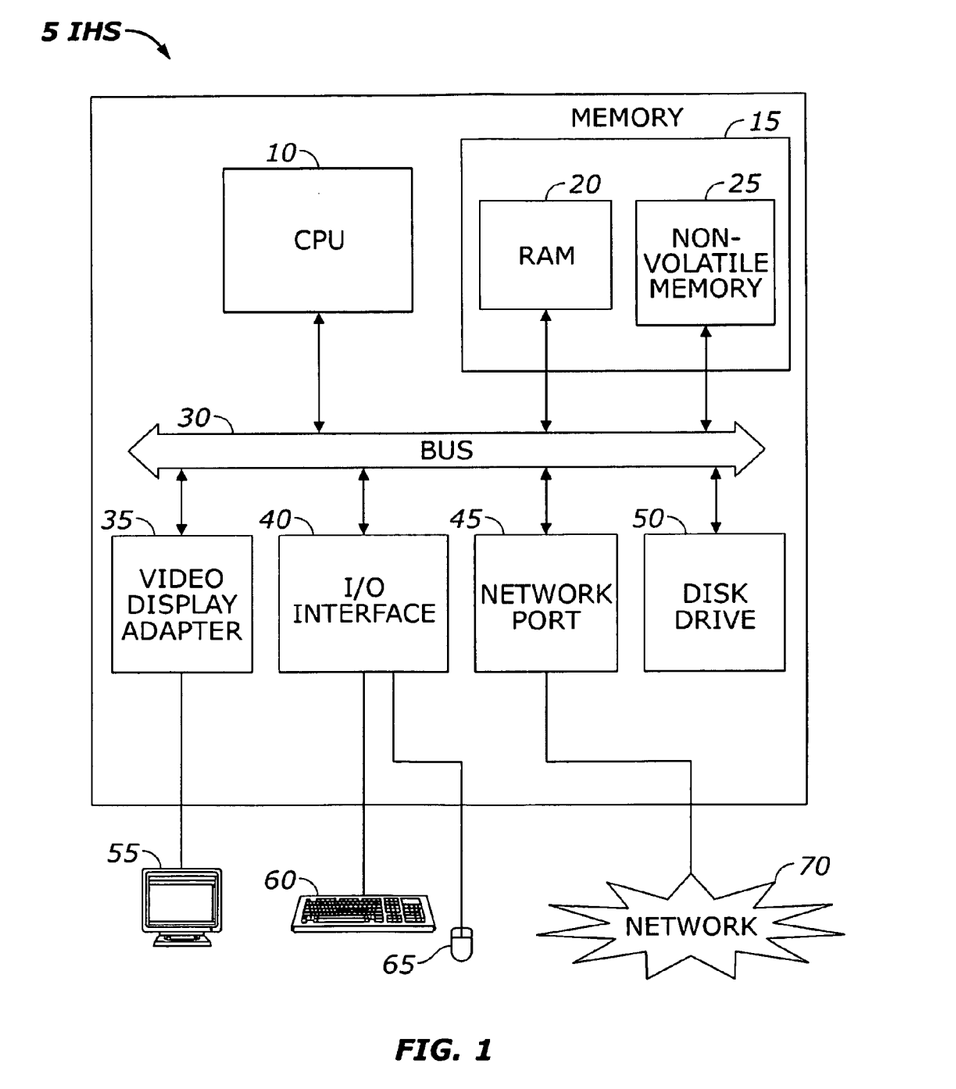
FIG. 1 represents an illustrative schematic of an information handling system (IHS) according to the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25.

The non-volatile memory 25 may include, but is not limited to, firmware flash memory, non-volatile random access memory (NVRAM), and electrically erasable programmable read-only memory (EEPROM). The non-volatile memory 25 may contain a firmware program 30 which may contain programming and/or executable instructions required to control a keyboard 60, mouse 65, video display 55 and/or other input/output devices not shown here. This type of firmware may be known as a basic/input output system (BIOS). The memory may also comprise random access memory (RAM) 20. The operating system and application programs (e.g., graphical user interfaces or GUIs) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65). The disk drive in some implementations comprises a magnetic disk that serves as the primary high-capacity storage media for the IHS. Such a disk drive is referred to as the hard drive or hard disk drive. Other implementations of IHSs include drives for reading optical disks (e.g., compact disk read only memory ("CD-ROM") and/or digital versatile disc ("DVD")).

In at least one implementation of an IHS, a system device recognizer (SDR) (not shown in FIG. 1) is stored in the non-volatile portion of the system BIOS, which may include, in some examples, the read-only memory (ROM) on the motherboard or the NVRAM upon the initial assembly of the IHS. In at least one implementation, the SDR comprises a plain text file that occupies as little as four (4) kilobytes in the non-volatile portion of the IHS BIOS where memory space is scarce.

Figure 2:
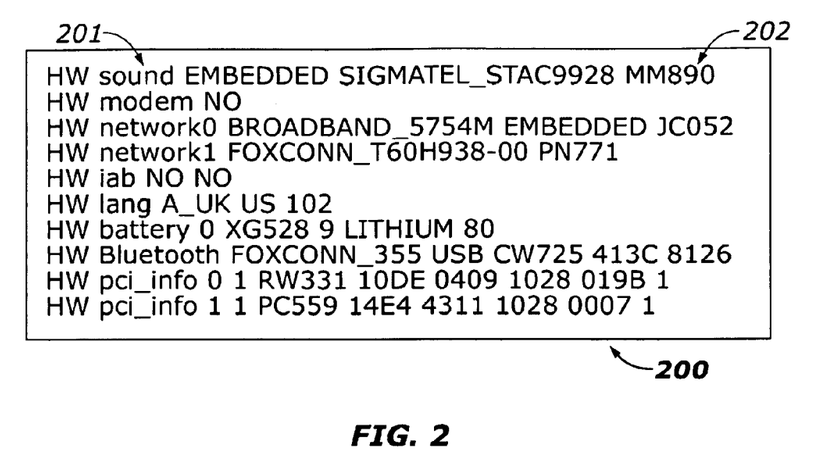
FIG. 2 represents an illustrative schematic of a system device recognizer (SDR) stored in non-volatile memory.

Referring now to FIG. 2, the SDR 200 stored in the non-volatile portion of the BIOS of a newly assembled system, in one possible implementation, comprises peripheral device and other component part names (e.g., sound card, network card, battery) (part names) and the corresponding peripheral device and other component part numbers (part numbers). In FIG. 2, for purposes of illustration only, the sound card 201 may have a part number of MM890 202. Peripherals purchased with a new IHS as part of a build to order process, in this disclosure, may have their part names and part numbers stored in the SDR of the IHS.

It is a common practice for new IHSs to be packaged with a RCD. The RCD permits the system to be re-initiated with software in the event of system software failure and typically contains all software that is purchased with a new system including its OS and drivers, as well as data related to the software and executable instructions. In this disclosure, each driver has associated with it one or more device IDs each representing a peripheral device that is compatible with the driver. Different models of a peripheral device may be compatible with different drivers.

Those skilled in the art may be familiar with the terms device ID and real device ID (also known as an instance ID). Both a device ID and a real device ID are identifiers for a peripheral typically assigned by the manufacturer for the peripheral, stored on the peripheral and that are accessible via a call to the PnP interface with the peripheral. A real device ID may add additional bus/slot information to the device ID for the peripheral. Real device IDs and device IDs may differ from a part number, which is an identifier for a peripheral assigned by the manufacturer of the IHS. As used herein, the term device ID shall may refer to a real device ID and/or device ID, whichever is most appropriate given the context.

Figure 3:
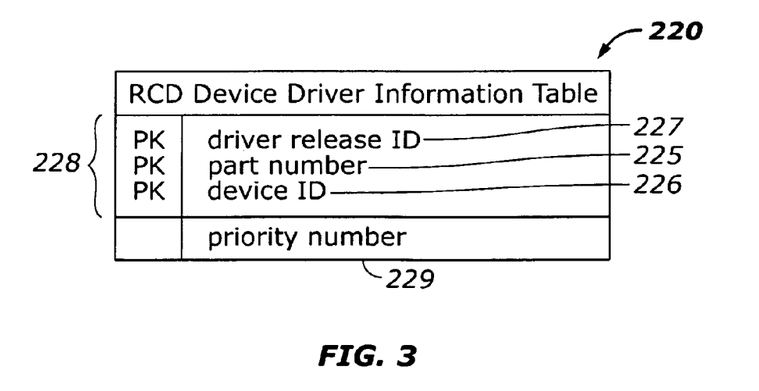
FIG. 3 represents an illustrative RCD Device Driver Information Table.

In at least one implementation of this disclosure, the RCD that accompanies an IHS stores data related to the drivers found on the RCD including, but not limited to, the release ID that identifies the driver, the device IDs that represent compatible peripherals for each driver, the part numbers for peripherals, and the priority number for software releases. As illustrated in FIG. 3, the fields for part number 225, device ID 226 for compatible peripherals and driver release ID 227 may serve as primary keys 228 in identifying the row from a RCD Device Driver Information Table 220 that contains the priority number 229 assigned to a driver (identified by its driver release ID) for a given peripheral identified by its part number and device ID. That priority number measures that driver (as identified by the driver release ID)'s fit to a given peripheral (identified by part number and device ID). In one implementation, the driver with the highest priority number may be the best fit for the peripheral.

Figure 4:
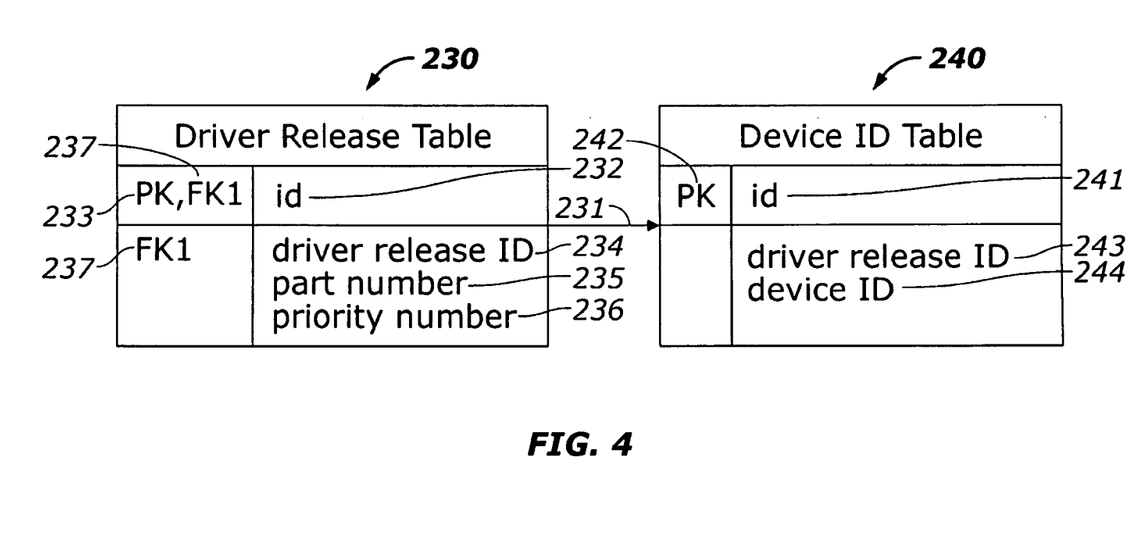
FIG. 4 illustrates how the RCD Device Driver Information Table is formed by joining the Device ID Table and the Driver Release Table.

The RCD Device Driver Information Table may be created by joining 231 the Driver Release Table 230 with the Device ID Table 240. The Driver Release Table 230 uses may use an id field 232 (a generic unique identifier for each row) as a primary key 233 to identify unique rows matching a driver represented by a driver release ID 234 with compatible peripherals represented by its part number 235 and priority number 236. The driver release ID and id are foreign keys 237 that may be also found in the Device ID Table. The Device ID Table 240 uses the id field 241 as a primary key 242 to identify uniquely rows matching a driver represented by a driver release ID with compatible peripherals identified by is device ID.

The priority number for each driver release is determined and assigned to each driver release during the driver development process. In some implementations of this disclosure, a higher priority number indicates a better compatibility between a driver and a peripheral device. In such implementations, as part of the development process for each new RCD release, the priority number for updated drivers included on the RCD are automatically incremented to give the most recent update the highest priority number. In such implementations, the development process for each RCD release would permit the priority of the latest driver to be decremented if that driver fails to work correctly with its intended compatible peripheral. This fail safe allows the user of the RCD to fall back on an older driver if it works better in practice.

In some implementations of this disclosure, the software (including drivers), executable code, and data found on the RCD can be made accessible to a user via a remote server accessible from the system from an internet browser.

FIG. 4 is a flow chart illustrating one possible method 300 of utilizing an RCD to install the appropriate drivers to prepare a new IHS for use. Various methods are contemplated including all or less than all of the steps mentioned below, any number of repeats of the steps mentioned below, and in any order. As illustrated in FIG. 4, a user can also employ a Graphical User Interface (GUI) application on an IHS to download the same driver software from a remote server. The GUI may be any GUI that provides an interactive interface for the user of the client IHS to view and download software code from a web page hosted on a remote server. According to one implementation, the GUI may be a browser.

The purchaser of a new IHS can begin the process of installing drivers by inserting the RCD into a drive of an IHS in step 305 or by using a GUI application to download driver software from a webpage hosted on a remote server ("GUI download") according to step 310. After either operation, executable code in either the RCD or the GUI-download reads the SDR part numbers stored in the BIOS 315. The seller of a new IHS that has been built to order can store part numbers for all peripherals purchased with the new IHS in the SDR found in the non-volatile portion of the BIOS to be read by the executable instructions contained in the RCD or the GUI download.

Next in step 320, the RCD or GUI reads the RCD Device Driver Information Table, in FIG. 3 220, from a database found on the RCD if the user is using the RCD. Alternatively, the system may read the same RCD Device Driver Information Table from a database found on the remote server if the user is using a GUI application to access a download page in step 325.

Figure 6:
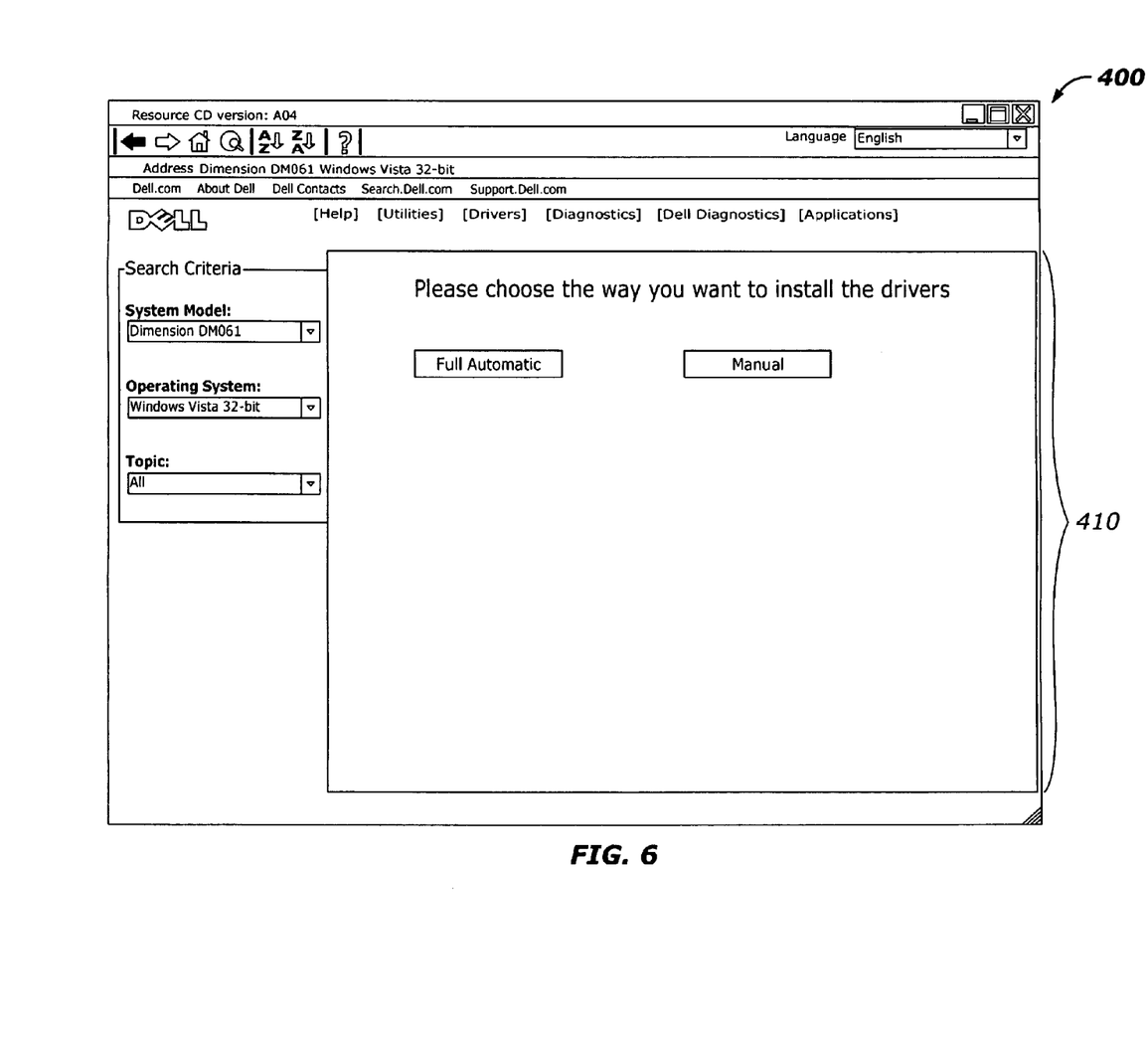
FIG. 6 represents an illustrative schematic of a user prompt generated by a graphical user interface (GUI) to initiate installation of drivers.

The current practice would require the user then to choose carefully from a large number of different driver download options that may vary by device name, driver release name, language and operating system. Under the approach set forth in this disclosure, the user is instead prompted that automatic driver installation will begin unless the user selects the option of manually installing drivers 330. In this disclosure, RCDs and the corresponding GUI download contain executable code that gives users this manual installation option. Now referring to FIG. 6, for purposes of illustration only, there is shown a screenshot 400 including a user prompt 410 requesting a method by which to install drivers.

Figure 5:
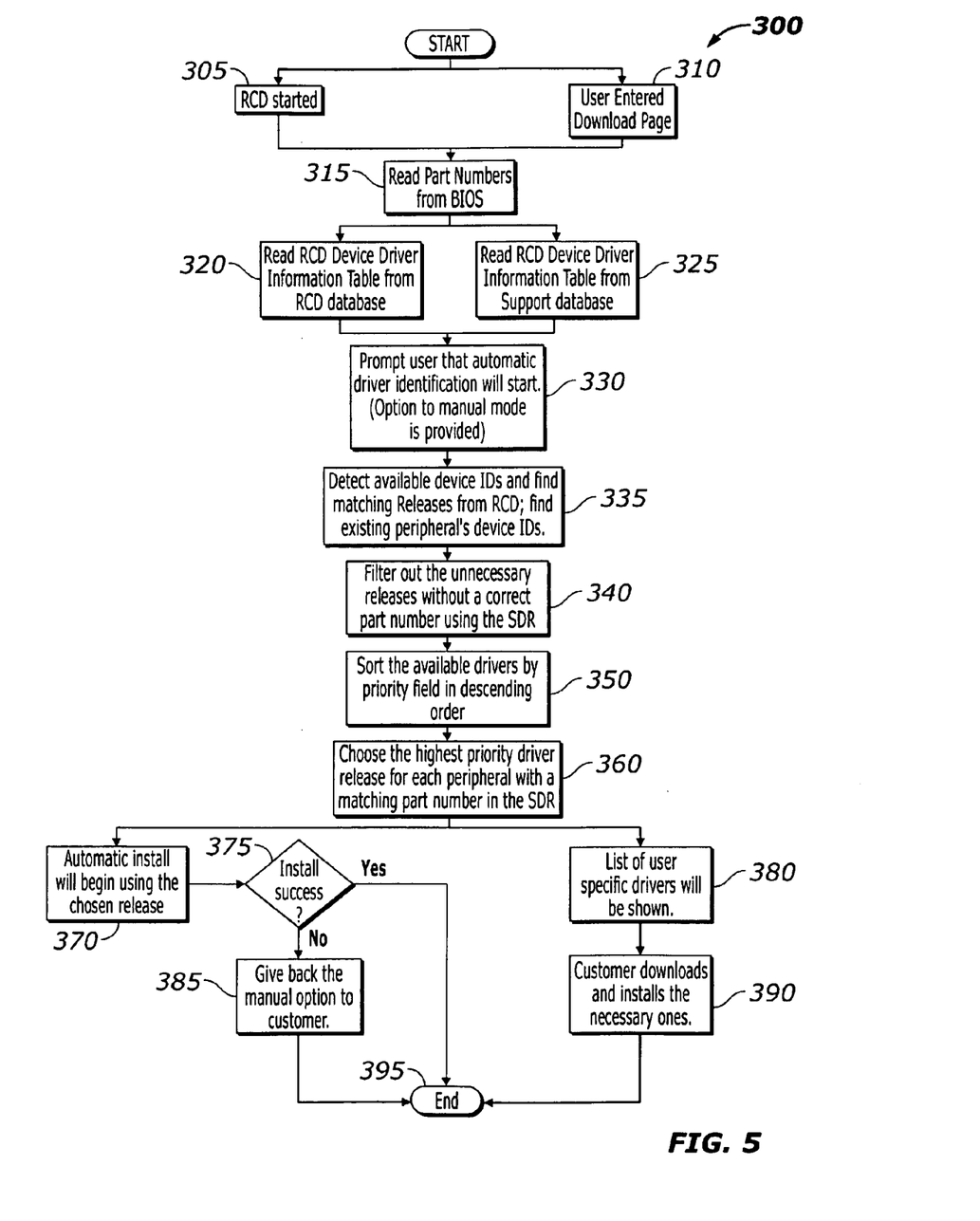
FIG. 5 represents a flow chart of an illustrative method for downloading drivers from a RCD or a GUI application to an his.

Now back to FIG. 5, in step 335, the RCD (or GUI download) calls the standard plug and play interface (PnP interface) to obtain device IDs for peripherals connected to the IHS and, finds driver release IDs for the matching drivers on the RCD The RCD uses the part numbers obtained from the SDR stored in the BIOS in step 315, the device IDs obtained through the PnP interface, driver release IDs for compatible drivers from RCD databases to identify rows in the RCD Device Driver Information Table to identify the rows that contain the peripheral's part number 225 and device ID 226 and a driver release ID 227 for a compatible driver and the priority number 229 for that driver. Each compatible driver release found on the RCD may be associated with one selected row.

The RCD (or GUI download) contains executable code that filters out 340 those peripherals that lack part numbers match those read from the SDR stored in BIOS 320, 325. The RCD compares the part numbers obtained from the SDR with part numbers in the selected rows of the RCD Device Driver Information Table. The driver releases identified in the rows that lack a matching part number are eliminated.

According to step 350, in one implementation, the RCD (or GUI download) sorts the remaining drivers by priority number and in step 360 chooses the driver with the highest priority number, which corresponds to the best compatibility with a peripheral device.

If the user has chosen the automatic installation option, installation of the chosen drivers begins without any further intervention by the user as indicated in step 370 and with a further installation completion check in step 375. If the user has chosen the manual installation option or if automatic installation fails in step 385, a list of compatible drivers may appear on a menu page in step 380 for download and installation by the user in step 390.

As illustrated in FIG. 5, this disclosure may permit a new user that chooses the automatic installation option to employ one step installation of drivers for peripherals purchased with a new IHS. Once the RCD has been inserted into the new IHS's drive or GUI download has been initiated, the IHS seamlessly selects and downloads the drivers that are most compatible with the peripherals connected to the IHS without need for further intervention by the user.

Figure 7:
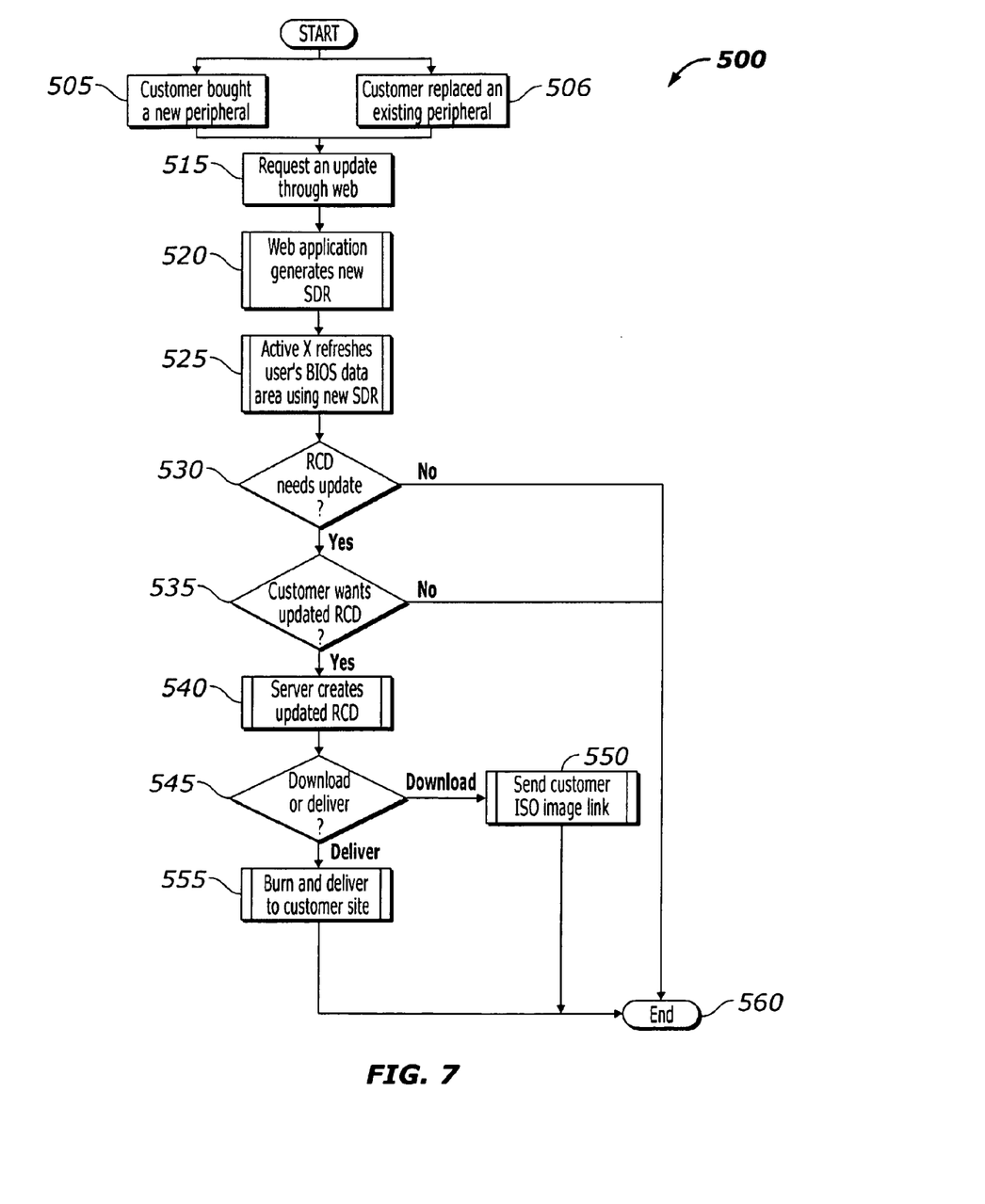
FIG. 7 represents a flow chart of an illustrative method for downloading a driver when new or updated peripheral hardware is to be used with an IHS.

Shown now in FIG. 7 is an illustrative method 500 depicting how a customer who has purchased a new peripheral 505 and/or replaced one peripheral with another 506 can update both the customer's RCD and the customer's SDR via a web down load. The peripheral driver disk that accompanies the new peripheral, when inserted into a disk drive of the IHS, requests an update through a web download page 515. The application on the web download page generates a new SDR 520 that has the part name and part number for the new peripheral. In one implementation, the user runs the download page using Active X software agents to refresh the IHS's BIOS data area with the newly generated SDR 525. In another implementation, Java applets may be used rather than Active X software agents.

To determine whether the RCD provided when the IHS was originally purchased needs updating 530, Active X software agents obtain the device ID and, if the new peripheral is purchased from the manufacturer of the IHS, obtains the IHS's and new peripheral's respective dates of sale from the manufacturer's server. Peripherals purchased after the IHS was originally purchased indicate a peripheral whose part name and number were not included in the built to order IHS and whose compatible drivers and other specifications were not included in the RCD that originally accompanied the IHS.

If the RCD needs to be updated, the system prompts the user with the option of updating the user's RCD in step 535. If the user agrees to accept an updated RCD, the server creates the updated RCD in step 540 by generating a template RCD image in ISO format that includes the part number and device ID for the new peripheral. In step 545, the user can choose to download this ISO image or to have it delivered. If download is the method selected, an ISO image link is sent to a user in step 550. In the event the delivery method is chosen, the ISO image of the new RCD is burned and delivered to the user in step 555.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method for installing peripheral software drivers comprising:
   storing a first identifier for a peripheral device meant for compatible operation with an information handling system (IHS) in a non-volatile memory of a basic input/output system (BIOS) of the IHS, wherein the first identifier comprises a part number of the peripheral device;
   updating the first identifier using a GUI application;
   matching the peripheral device represented by the first identifier stored in the BIOS with compatible driver releases accessible by the IHS represented by a second identifier, wherein the second identifier comprises a driver release ID;
   sorting the compatible driver releases by priority;
   installing a highest priority driver release on the IHS; and
   eliminating driver releases not represented by the first identifier.

2. The method of claim 1, wherein the first identifier is first provided on a resource compact disc read-only memory (RCD).

3. The method of claim 2, further comprising updating the RCD using the GUI application.

4. The method of claim 3, wherein the RCD prompts a user to manually install peripheral software drivers.

5. A computer-readable storage medium having executable instructions for performing a method comprising:
   storing a first identifier for a peripheral device meant for compatible operation with an information handling system (IHS) in a non-volatile memory of a basic input/output system (BIOS) of the IHS, wherein the first identifier comprises a part number of the peripheral device;
   updating the first identifier using a GUI application;
   matching the peripheral device represented by the first identifier stored in the BIOS with compatible driver releases accessible by the HIS represented by a second identifier, wherein the second identifier comprises a driver release ID;
   sorting the compatible driver releases by priority;
   installing a highest priority driver release on the IHS; and
   eliminating driver releases not represented by the first identifier.

6. The computer-readable storage medium of claim 5, wherein the second identifier is first provided on a resource compact disc (RCD).

7. The computer-readable storage medium of claim 6, further comprising executable instructions for updating the RCD using the GUI application.

8. The computer-readable storage medium of claim 6, wherein the RCD prompts a user to manually install peripheral software drivers.

9. An information handling system (IHS) comprising:
   a processor;
   a non-volatile memory coupled to the processor, wherein the non-volatile memory is configured to store a first identifier for a peripheral device meant for compatible operation with the IHS, wherein the first identifier is updated using a GUI application, the first identifier being stored in a non-volatile memory of a basic input/output system (BIOS) of the IHS, and wherein the first identifier comprises a part number of the peripheral device; and
   a storage device for reading computer readable media, wherein the computer readable media has executable instructions for performing a method comprising:
      accessing by the IHS of driver releases;
      matching the peripheral devices represented by the first identifier with accessed compatible driver releases represented by a second identifier, wherein the second identifier comprises a driver release ID;
      sorting the compatible driver releases by priority;
      installing a highest priority driver release on the IHS; and
      eliminating driver releases not represented by the first identifier.

10. The system of claim 9, wherein computer-readable media is a resource compact disc read-only memory (RCD).

11. The system of claim 10, wherein the RCD prompts a user to manually install peripheral software drivers.

12. The system of claim 9, wherein the computer-readable media further has executable instructions for self-updating using the GUI application.

* * * * *